UNITED STATES PATENT OFFICE.

SIEGMUND SAUBERMANN, OF BERLIN, GERMANY, ASSIGNOR OF ONE-HALF TO THE FIRM OF CARL ZEISS, OF JENA, GERMANY.

PROCESS FOR PRODUCING PECULIAR LUMINOUS EFFECTS.

1,096,644.  Specification of Letters Patent.  Patented May 12, 1914.

No Drawing.  Application filed November 29, 1913. Serial No. 803,666.

*To all whom it may concern:*

Be it known that I, SIEGMUND SAUBERMANN, a citizen of the German Empire, residing at Berlin, Germany, have invented a new and useful Process for Producing Peculiar Luminous Effects, of which the following is a specification.

The present invention is a development of the well-known process for producing peculiar luminous effects, more particularly as applied to the stage, by means of the action of invisible rays on fluorescent substances, such as is described, for instance, in the patent specification 1025338. The illuminating power of fluorescent substances may be considerably increased, by exciting them to fluorescence not only by irradiating them with the invisible rays of a source of light (*e. g.* a search-light), but additionally by subjecting them to the action of fluorescent light from other suitable fluorescent substances, which are themselves irradiated by invisible rays. By this means a total fluorescent light is obtained, which is considerably brighter than that, which would be produced by the irradiation of the substances used with invisible rays, if the auxiliary substances did not act so as to excite fluorescence. Such auxiliary fluorescent substances are those that emit, when in a state of fluorescence, rays, which excite the first named fluorescent substances to fluorescence, *i. e.* principally such substances, the fluorescent light of which is in the neighborhood of the ultraviolet part of the spectrum. In carrying the process into practice the auxiliary fluorescent substances will be placed in the path of the invisible rays either in the form of a thin filter immediately in front of, or as a coating on the other fluorescent substances, or a mixture of suitable fluorescent substances will be made use of.

The process described usually results, besides in an increase in luminosity, in the total fluorescent light assuming a new color, so that in this way it becomes possible by a suitable combination of differently fluorescing substances to produce certain tones of color. The mixing for instance of hexagonally crystallized sulfid of zinc, the fluorescent light of which is green under the action of pure ultraviolet rays, with heavy hydrocarbids, *e. g.* paraffin, the fluorescent light of which under the action of the same rays ranges from violet to sky-blue, will result as the total effect in a canary-yellow light, which not only appears considerably brighter than the green light given off by the sulfid of zinc in ultraviolet light, but also considerably brighter than the combined fluorescent light of the two substances employed, if the sulfid of zinc were to be excited only by the ultraviolet rays of the source of light used. Similarly with mixtures of rhodamine, the fluorescent light of which is yellowish red, and paraffin, the fluorescent light of which is whitish blue, a fluorescent light may be obtained under the action of ultraviolet rays, which according to the proportions of the components ranges from cobalt-blue, through violet to Burgundy-red, the mixture at the same time causing a considerably greater luminosity, than if the rhodamine were to be excited only by the ultraviolet rays of the source of light used and the fluorescent light of the two substances were to be combined.

I claim:

1. Process for producing peculiar luminous effects consisting in subjecting the substances to be excited to fluorescence, besides to the action of the invisible rays of a source of light, also to the action of fluorescent light from other fluorescent substances, which are in contact with the former and emit rays, which excite these to fluorescence.

2. Process for producing peculiar luminous effects consisting in subjecting the substances to be excited to fluorescence, besides to the action of the invisible rays of a source of light, also to the action of fluorescent light from other fluorescent substances, the said substances being mixed together and the said other substances emitting rays, which excite the former to fluorescence.

3. Process for producing peculiar luminous effects consisting in subjecting the substances to be excited to fluorescence, besides to the action of the invisible rays of a source of light, also to the action of fluorescent light from heavy hydrocarbids, the said substances and the hydrocarbids being mixed together and the hydrocarbids emitting rays, which excite the said substances to fluorescence.

4. Process for producing peculiar luminous effects consisting in subjecting the substances to be excited to fluorescence, besides to the action of the invisible rays of a source of light, also to the action of fluorescent light from paraffin, the said substances and the paraffin being mixed together and the paraffin emitting rays, which excite the said substances to fluorescence.

5. Process for producing peculiar luminous effects consisting in subjecting rhodamine, besides to the action of the invisible rays of a source of light, also to the action of fluorescent light from paraffin, the rhodamine and the paraffin being mixed together and the paraffin emitting rays, which excite the rhodamine to fluorescence.

SIEGMUND SAUBERMANN.

Witnesses:
PAUL KRÜGER,
RICHARD HAKER.